(12) United States Patent  
Matsuda et al.

(10) Patent No.: US 8,429,690 B2
(45) Date of Patent: Apr. 23, 2013

(54) TV PROGRAM SEARCH APPARATUS

(75) Inventors: Takahiro Matsuda, Kawasaki (JP); Akira Karasudani, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 713 days.

(21) Appl. No.: 11/847,150

(22) Filed: Aug. 29, 2007

(65) Prior Publication Data

US 2008/0134248 A1    Jun. 5, 2008

(30) Foreign Application Priority Data

Nov. 30, 2006  (JP) ................................. 2006-324767

(51) Int. Cl.
*H04N 5/445* (2011.01)

(52) U.S. Cl.
USPC .................................. 725/46; 725/45; 725/49

(58) Field of Classification Search .................. 725/46, 725/45, 49
See application file for complete search history.

(56) References Cited

U.S. PATENT DOCUMENTS

| 6,426,778 | B1* | 7/2002 | Valdez, Jr. .................... 348/461 |
| 7,657,906 | B2* | 2/2010 | Icho et al. ........................ 725/45 |
| 2002/0042923 | A1 | 4/2002 | Asmussen et al. |
| 2004/0033777 | A1 | 2/2004 | Farineau et al. |
| 2004/0123318 | A1* | 6/2004 | Lee et al. ........................ 725/46 |
| 2005/0149514 | A1* | 7/2005 | Tsuzuki et al. ................... 707/3 |
| 2006/0129547 | A1 | 6/2006 | Yamamoto et al. |
| 2006/0159109 | A1* | 7/2006 | Lamkin et al. ................. 370/401 |
| 2006/0248091 | A1* | 11/2006 | Yamamoto et al. ........... 707/100 |
| 2007/0073646 | A1* | 3/2007 | Uchibe et al. ..................... 707/2 |

FOREIGN PATENT DOCUMENTS

| EP | 1 684 507 A1 | 7/2006 |
| JP | 5-62283 | 3/1993 |
| JP | 2001-86420 | 3/2001 |
| JP | 2005-191816 | 7/2005 |
| JP | 2005-191817 | 7/2005 |
| KR | 10-2006-0117959 | 11/2006 |

OTHER PUBLICATIONS

Korean Office Action dated Dec. 12, 2008 issued in corresponding Korean Patent Application 10-2007-0094796.
European Search Report dated Nov. 30, 2010 in corresponding European Patent Application 07115326.6.

* cited by examiner

*Primary Examiner* — Pankaj Kumar
*Assistant Examiner* — Franklin Andramuno
(74) *Attorney, Agent, or Firm* — Staas & Halsey LLP

(57) ABSTRACT

Record history record processing accumulates all user operations relating to program recording in a storage as a recording history. Preference change analysis processing extracts recorded programs in the most recent period from the recording history, obtains the weight of a word in the recorded program from an index from an EPG, adds the weight of the word to a preference in a period. The preference in programs for a period immediately preceding the most recent period is normalized, and a degree of similarity to the preference in the most recent period is calculated. Preference query generation processing emphasizes (five-fold) the weight of the words contained in the recorded programs in the period (June) and generates a preference query.

16 Claims, 14 Drawing Sheets

[EXAMPLE 1: LARGE PREFERENCE CHANGE]

| GENRE | MAY | JUNE | AMOUNT OF CHANGE |
|---|---|---|---|
| SPORT | 5 | 2 | 3 |
| DRAMA | 3 | 5 | 2 |
| COOKING | 2 | 3 | 1 |
| | | TOTAL | 6 |

[EXAMPLE 2: SMALL PREFERENCE CHANGE]

| GENRE | MAY | JUNE | AMOUNT OF CHANGE |
|---|---|---|---|
| SPORT | 5 | 4 | 1 |
| DRAMA | 3 | 4 | 1 |
| COOKING | 2 | 2 | 0 |
| | | TOTAL | 2 |

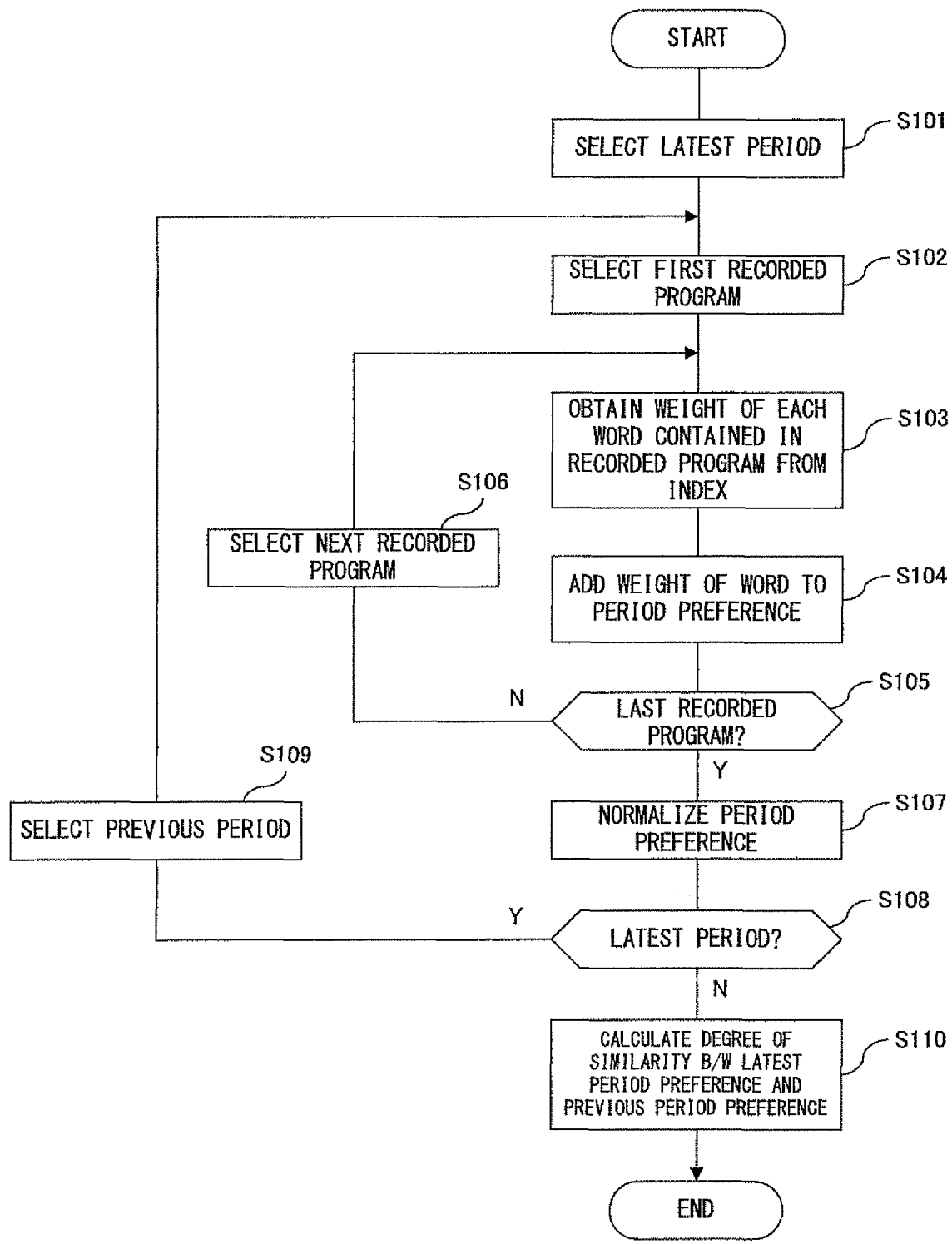
F I G. 8

[EXAMPLE 1: LARGE PREFERENCE CHANGE]

| GENRE | MAY | JUNE | AMOUNT OF CHANGE |
|---|---|---|---|
| SPORT | 5 | 2 | 3 |
| DRAMA | 3 | 5 | 2 |
| COOKING | 2 | 3 | 1 |
| | | TOTAL | 6 |

23

[EXAMPLE 2: SMALL PREFERENCE CHANGE]

| GENRE | MAY | JUNE | AMOUNT OF CHANGE |
|---|---|---|---|
| SPORT | 5 | 4 | 1 |
| DRAMA | 3 | 4 | 1 |
| COOKING | 2 | 2 | 0 |
| | | TOTAL | 2 |

24

F I G. 10

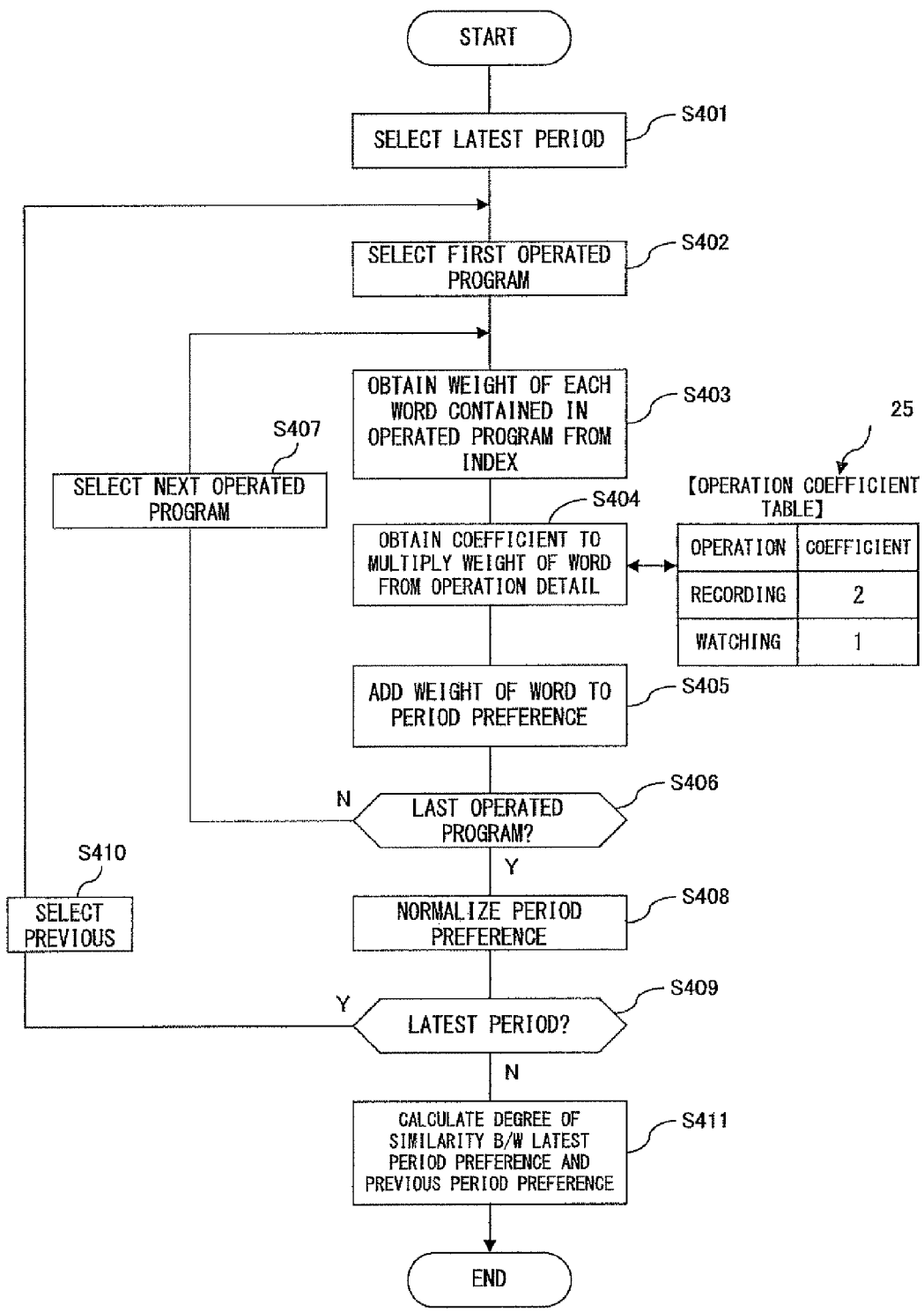
F I G. 1 2

| PERIOD | DEGREE OF SIMILARITY WITH PREFERENCE INFO. IN PREVIOUS PERIOD |
|---|---|
| JANUARY | — |
| FEBRUARY | 0.8 |
| MARCH | 0.9 |
| APRIL | 0.8 |
| MAY | 0.8 |
| JUNE | 0.3 |
| JULY | 0.8 |

F I G. 1 4

TV PROGRAM SEARCH APPARATUS

BACKGROUND OF THE INVENTION

1. Field of the Invention

The present invention relates to a TV program search apparatus that allows users to search for TV programs on the basis of a user's preferences.

2. Description of the Related Art

In recent years, functions to make TV watching and the recording of TV programs easier have been developed as a result of the digitization of TV systems.

Of those functions, in a TV recorder using a high-capacity storage such as a HD (Hard Disk), timer recording can be easily accomplished by combining the high capacity storage with an EPG (Electronic Program Guide), causing a substantial change to the TV watching styles of users.

Additionally, functions which automatically record programs containing keywords that a user is interested in and which recommend programs that match a user's preferences by automatically determining the preferences on the basis of the user's recording history have been developed.

In the function for recommending a program reflecting a user's preferences, a crucial point is the degree of similarity (accuracy) between a user's preferences and the programs recommended.

A technique for deriving a user's preferences on the basis of recording history discovers the recording history of TV programs (recorded programs and programs preferred by a user), obtains the contents of the recorded programs from the text information of the EPG, and extracts the common grounds in the recorded programs on the basis of the EPG contents.

Finally, programs with contents similar to the above common grounds (preference information) are selected from the programs to be broadcast in the future. This is the typical method.

As an example of a technique relating to the search for programs on the basis of a user's preferences, an automatic learning recorder for automatically recording a program without timer recording when a user does not watch or record a preferred program has been suggested (see Japanese Patent Application Publication No. 05-062283).

As an example of the use of the degree of similarity between preferences and a program, a television program search apparatus that determines the degree of similarity among combinations of programs by examining the users' program viewing history independently of the frequency of watching has been suggested (see Japanese Patent Application Publication No. 2005-191816).

In addition, a television program search apparatus that calculates the weight of a preference by multiplying the frequency of appearance of a particular keyword with the number of programs that include the keyword has been also suggested (Japanese Patent Application Publication No. 2005-191817).

Furthermore, a broadcasting terminal apparatus having a broadcasting terminal installed with a function for determining programs suitable for a user on the basis of user history and which automatically records the programs suitable for the user without the user proactively initiating this operation has been suggested (Japanese Patent Application Publication No. 2001-86420).

All of the techniques shown in the above patent documents of Japanese Patent Application Publication No. 05-062283, No. 2005-191816, No. 2005-191817, and No. 2001-86420 can automatically extract a user's preferences and search for a recommended program. However, each assumes that a user's preferences are constant and do not change with time.

In other words, the techniques disclosed in the above patent documents lack a technical idea for automatically searching for recommended programs by automatically following changes in a user's preferences when a user's preferences change.

Therefore, the disclosed techniques do not immediately generate search requests reflecting the changed preferences when a user's preferences change.

Consequently, because the recommended programs do not correspond to the change in a user's preferences, the recommended result is far from the user's preferences. This results in a decline in the accuracy of the program search.

All of the methods in the above patent documents have the problem that if a user's preferences change, either the user has to reset the history of the preference information in order to have the program search apparatuses recommend programs on the basis of the changed preferences or the user has to once again accumulate information relating to the user's viewing history in order to reflect these changed preferences.

In a case in which the preference information is not reset, the information relating to the changed preferences (e.g., a word) will appear infrequently at the time of the change, and therefore will not be extracted as preference information.

Consequently, because the recommended results are far from the user's preferences, there is a substantial decline in the accuracy of the program search.

The "Program recommendation functions" was originally designed to automatically find programs that users prefer. Thus, a highly accurate program recommendation function that follows the changes in a user's preferences without any need for the user to reset the operation history at the time the preferences are changed has been sought.

Generally, changes in preferences do not occur suddenly at full scale or in a comprehensive manner. Rather the changes occur gradually without the user realizing that any change has occurred.

Therefore, it is impractical to expect users to reset the operation history at the time of changes in their viewing preferences.

SUMMARY OF THE INVENTION

In light of the above, an object of the present invention is to provide a program search apparatus that automatically finds recommended programs in accordance with changes in a user's preferences.

The program search apparatus according to the present invention comprises program information storage unit storing program information, operation history storage unit storing TV operation history, preference information management unit generating preference information from the program information and the TV operation history and for managing the preference information at prescribed periods, and preference change amount calculation unit calculating an amount of change of the preference information managed at prescribed periods; further, the apparatus generates a search request with a weight adjusted according to the amount of change of the preference information, and searches for a recommended program from the program information on the basis of the search request.

The program search apparatus comprises unit generating vector information as the preference information consisting of the weight of a word calculated from statistics of words and program names and a program name obtained from electronic program information, and comprises preference information generation unit consisting of a program name and the frequency of appearance of a genre obtained from electronic program information as the preference information.

The program search apparatus further comprises operation detail weight adjustment unit adjusting the weight of the word contained in the search request when generating the search request according to TV operation details included in the TV operation history.

The apparatus further comprises preference information weight adjustment unit adjusting the weight of the word contained in the preference information when generating the preference information to be managed at prescribed periods according to the TV operation detail included in the TV operation history.

The apparatus further comprises degree of similarity weight adjustment unit adjusting the weight of the word contained in the search request when generating the search request according to the degree of similarity between preferences at prescribed periods.

The preference change amount calculation unit sets a target period for calculating an amount of change of the preference information to be the combination of the latest period and one period before the latest period.

The program search apparatus further comprises change continuation period calculation unit calculating a period during which the preference change remains in continuous existence. The target period is set to be the latest period, and when generating a search request in the target period, the weight of a word consisting of the search request is multiplied by a coefficient of a certain value or higher.

The present invention automatically extracts a user's preferences and changes in the preferences and searches for recommended programs, enabling the search for recommended programs to be performed with a higher accuracy; as a result, it is possible to provide a program search apparatus for searching for recommended programs with a higher accuracy that follows changes in a user's preferences.

BRIEF DESCRIPTION OF THE DRAWINGS

FIG. 8 is a flowchart that explains details of the acquisition of preference changes via the preference change analysis process;

FIG. 10 is a diagram showing an example of preference change using genres as another example of preference change analysis;

FIG. 12 is a flowchart of processing in which calculation of preferences in a certain period is performed in accordance with the operation details of programs;

FIG. 14 is a diagram showing an example of a period degree of similarity table for determining whether or not the preference change of a user is temporary or continuous.

DESCRIPTION OF THE PREFERRED EMBODIMENTS

In the following description, details of the embodiments of the present invention are set forth on the basis of the drawings.

It should be noted that in the embodiments of the present invention, an information processor integrating a TV function is shown as an example; however, for dedicated devices such as a video recorder, there is no difference in the operations.

In addition, even though the explanation uses the history of recording operation as the example of a TV operation, the TV operations are not limited to the history of recording operation. Rather, all TV operations relating to a user's preferences such as the watching, editing and deleting of recorded programs fall within the scope of the present invention.

First Embodiment

Figure 1:
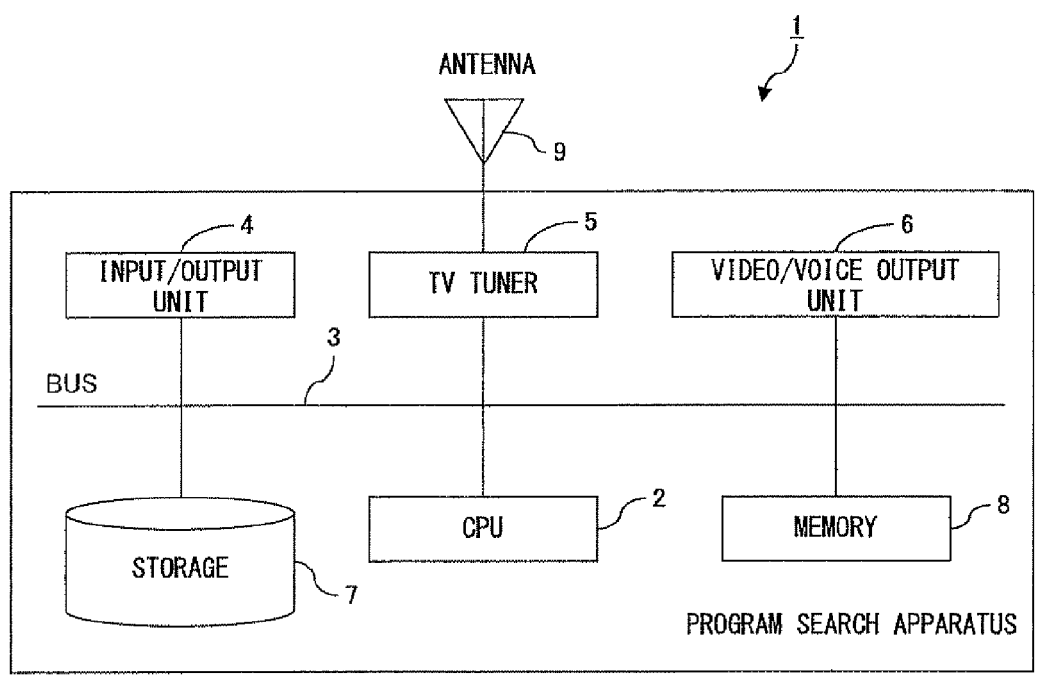
FIG. 1 is a block diagram showing a circuit configuration of a program search apparatus of the first embodiment.

FIG. 1 is a block diagram showing a circuit configuration of the program search apparatus of the first embodiment. A program search apparatus 1 in FIG. 1 shows a TV function integrated information processor.

As shown in FIG. 1, the program search apparatus 1 mainly comprises a CPU (Central Processing Unit) 2, an input/output unit 4 connected to the CPU 2 via a bus 3, a TV tuner 5, a video/voice output unit 6, a storage unit 7, and a memory unit 8. Note that an antenna 9 is connected to the TV tuner 5.

The storage unit 7 stores the TV program, the CPU 2 loads the program into the memory 8 once watching begins, and TV broadcasting input from the TV tuner 5 via the antenna 9 is processed.

The processed result is output to a monitor or a speaker via the video/voice output unit 6. A user conducts operations such as TV watching and recording of the settings by using the input/output unit 4 having an input/output device such as a keyboard, a mouse, or a remote controller.

The basic operation relating to the program search apparatus of the present invention is set forth in the following description. The basic process for extracting a user's preferences and searching for recommended programs is explained first.

First, in the basic process for searching for recommended programs, similarities in recorded programs are calculated from the recording history of TV programs in order to extract a user's preferences.

The calculated result is hereinafter referred to as preference information. From the preference information, a search request (hereinafter referred to as "preference query" in light of a search request being performed on the basis of the preference information) is generated, and recommended programs are searched for from an Electronic Program Guide (EPG) using the preference query.

Figure 2:
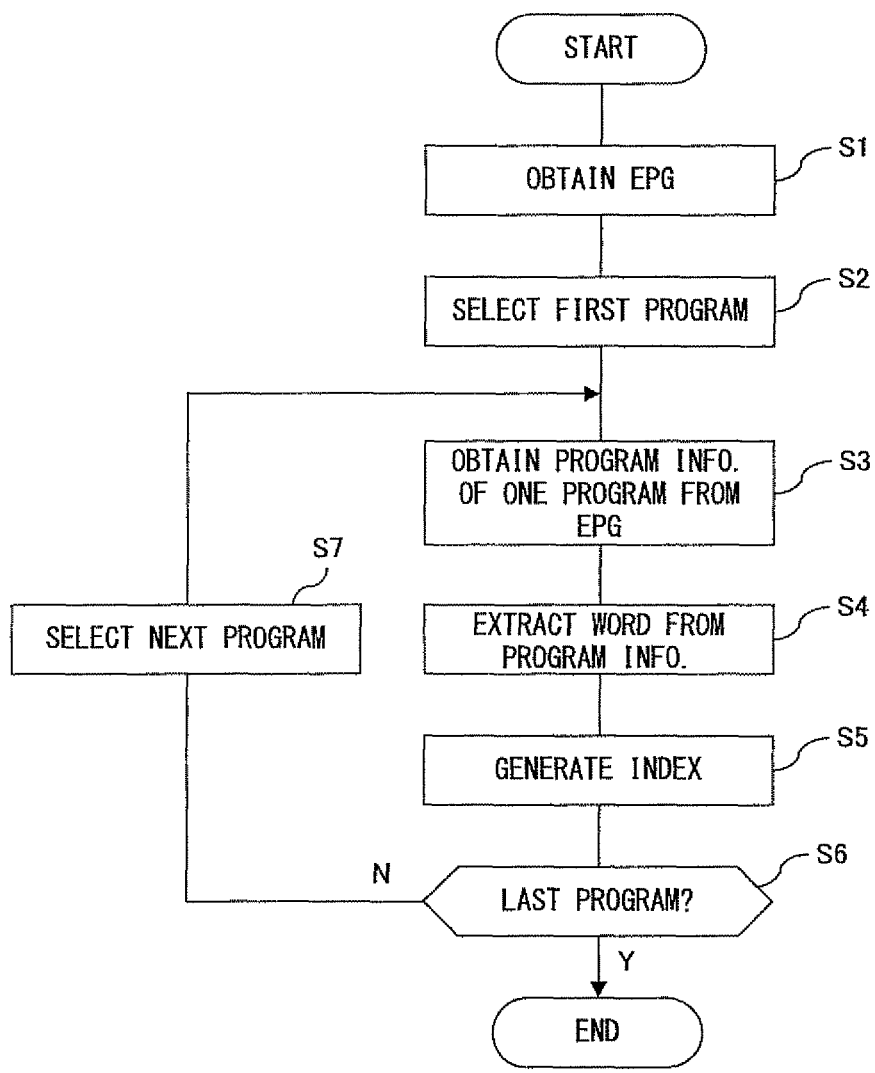
FIG. 2 is a flowchart explaining the process of generating a search index from an EPG by extracting a user's preferences to search for recommended programs.

FIG. 2 is a flowchart explaining the process of generating a search index from an EPG in the basic process of searching for recommended programs by extracting a user's preferences.

In FIG. 2, first, an EPG is obtained (step S1).

The EPG includes an EPG of search-subject programs to be broadcast and an EPG of recorded programs for generating the preference information.

Next, the first program is selected from the EPG (step S2). The program information of the selected program is then obtained (step S3).

As explained above, the EPG extracts the program information for each program. This process extracts all information that includes text explaining the contents of the program such as program title, program content, cast members, and genres.

A word is extracted from the program information (step S4).

For the extraction of a word, morphological analysis can be employed for the Japanese language. However, the method is not limited to morphological analysis; as long as it is a method that enables the extraction of words, no particular limitations are applied to the method of word extraction processing.

Next, an index is generated from the extracted word (step S5).

As a generation method of the index, "TF×1/DF" can be employed. TF (Term Frequency) is the frequency in which information such as a particular word (keyword) appears in a program. DF (Document Frequency) is the number of programs which contain the particular word (keyword).

Statistics of the word (keyword) are generated by "TF×1/DF", and this generates the weight of each word (keyword).

A search apparatus using "TF×1/DF" is a search apparatus generally used in a text search. When an index is generated by this method, the index is generated in a vector space of i×j where the number of programs is i and the type of word extracted from the programs is j.

The value of "TF×1/DF" is used as a weight W of each element of the index.

Following the above index generation, the determination of whether or not the program is last in order is made (step S6). If the program is not the last program (N in S6), the next program is selected (step S7), and the processes begin again at step s3.

The processing of steps S3-S6 (or S7) is repeated. As a result, the index of all the programs of the EPG is generated.

When the last program is determined in step S6 (Y in step S6), the process is terminated.

Second Embodiment

Figure 3:
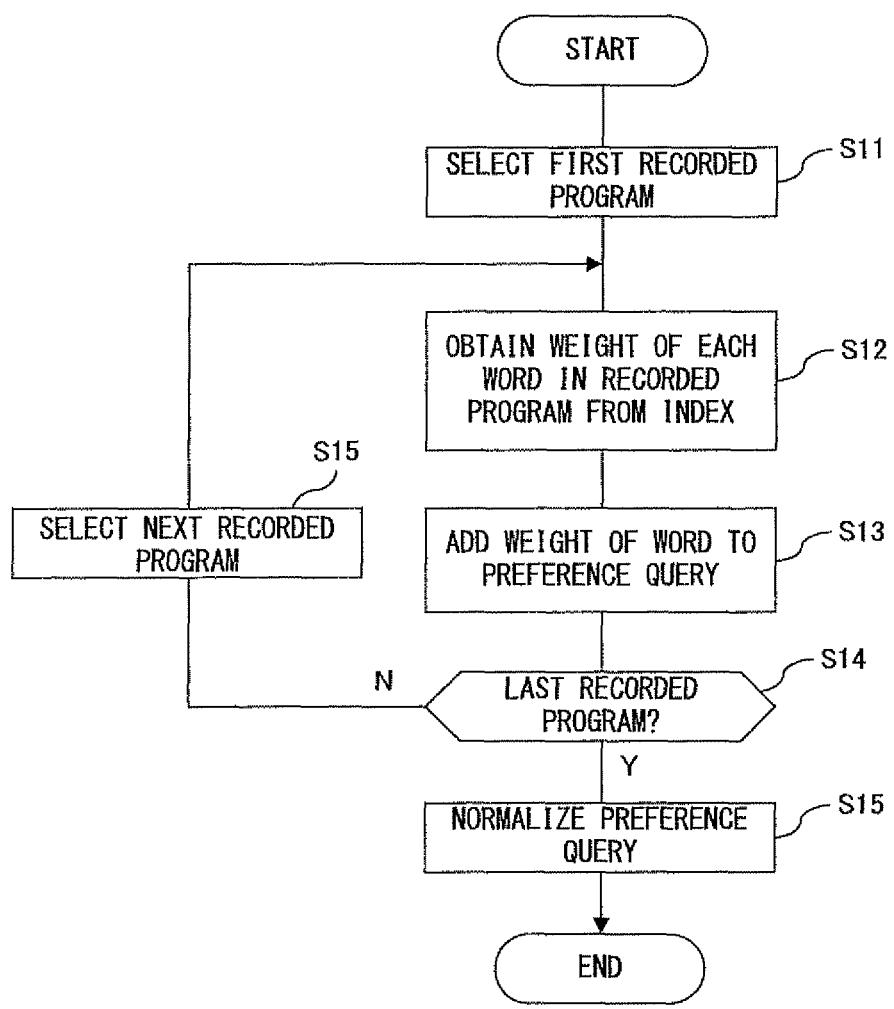
FIG. 3 is a flowchart explaining a method for extracting a user's preferences and for generating a preference query from recording history information in the basic processing in which the recommended programs are searched.

FIG. 3 is a flowchart explaining a method for extracting a user's preferences and for generating a preference query from recording history information in the basic processing where the recommended programs are searched.

In FIG. 3, the first recorded program is selected from the recording history (step S11). Next, from the index generated in the processing of FIG. 2, the weight of each word contained in the selected recorded program is obtained (step S12). The word, the weight of which is obtained in the processing, is the "preference query".

In the processing, if the same word repeatedly appears, each appearance adds weight to the word. (step S13).

Next, once it is determined whether or not the recorded program is the last (step S14), and if it is not the last recorded program (N in S14), the next recorded program is selected (step S15), and the processing begins again in Step S12.

The processing of steps S12-S14 (or S15) is repeated. As a result, a preference query in which weight is added to each word contained in all recorded programs is generated.

When the program is determined to be the last recorded program in the determination in step S14 (Y in S14), the above generated preference query is normalized (step S16), and the processing is terminated.

The normalized preference query is the preference query used when a program is actually searched on the basis of the preference information contained in recorded programs.

It should be noted that, while cosine normalization and pivot normalization can be employed for the normalization of the preference query, any method of normalization can be employed.

Figure 4:
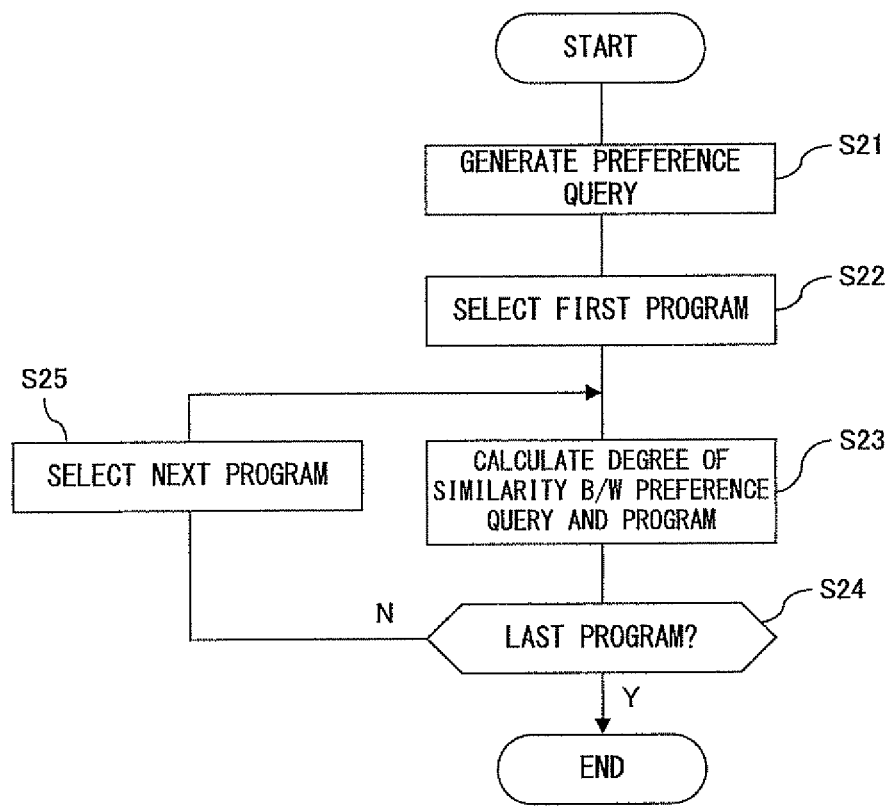
FIG. 4 is a flowchart explaining a method whereby a recommended program is searched in the basic processing of extracting a user's preferences and searching for recommended programs.

FIG. 4 is a flowchart explaining a method in which a recommended program is searched in the basic processing of extracting a user's preferences and searching for recommended programs.

In FIG. 4, first, in the same method as the processing in FIG. 3, a preference query is generated (step S21).

Next, the first program is selected from an EPG (step S22) and the degree of similarity between the preference query and the selected program is calculated using the selected program and the index generated in the processing in FIG. 2 (step S23).

The calculation of the degree of similarity can be realized by calculating the product of the weights of the words in common in the preference query and each search-subject program, and by calculating the sum of the products within the program.

A program similar to the preference query should have a large degree of similarity value, and therefore, a program with a large value in terms of the degree of similarity will be the recommended program.

It should be noted that in the calculation method of the degree of similarity, a table is generated to indicate the degree of similarity between the preference query and programs in descending order of the degree of similarity value.

After it is determined whether or not the program is last in order (step S24), and if the program is not the last (N in S24), the next program is selected (step S25), the processing returns to the processing in step S23, and the processing repeats itself in steps S23 and S24 (and S25).

When the last program is determined in step S24 (Y in S24), the processing is terminated.

As a result, the program search based on the preference query is terminated. The programs are introduced to users in, for example, descending order of the degree of similarity with the preference query.

In the above description, there is a principle such that when a user's preferences are constant and unchanging over time, an increase in the number of recorded programs stabilizes the preference information, thus improving the accuracy of recommended programs (probability of agreement with a user's preferences).

If, however, the user's preferences change, there is a problem in that programs that reflect the new preferences cannot be recommended because of the significant influence that past preferences have.

Figure 5:
FIG. 5 is a diagram showing an example of a change in a user's preferences as an example of preference information within a period of time.

FIG. 5 is a diagram showing an example of such change in a user's preferences as an example of preference information within a period of time. Note that FIG. 5 shows an example of preference information that extends from January to June.

The preference information of a user shown in FIG. 5 has a column entitled "No.", a column entitled "period" and a column entitled "words mainly contained in the recorded programs" as a database of words contained in the recorded programs.

In each row corresponding to each column, row numbers 1-6 are recorded in the column entitled "No.". In the column entitled "period", each month from January to June corresponds to the row numbers of 1-6 in the column "No.".

The column entitled "words mainly contained in the recorded programs" has records such as "recipe, cooking, dishes, food in season, vegetables, . . . " in the row corresponding to January of the column entitled "period".

In the row corresponding to February in the column entitled "period", "chef, Japanese food, recipe, vegetables, ingredients, . . . " are recorded.

Likewise, "vegetables, Chinese food, rice, dishes, . . . " are recorded in the row corresponding to March in the column entitled "period", and "Japanese food, recipe, cooking, seafood, . . . " are recorded in the row corresponding to April in the column entitled "period".

Additionally, "seafood, recipe, chef, rice, . . . " is recorded in the row corresponding to May in the column "period", and "dishes, soccer, Germany, recipe, the World Cup, . . . " are recorded in the row corresponding to June in the column entitled "period".

As is obvious from the preference information of FIG. 5, most of the words contained in the user's recorded programs from January to May, such as recipe, dishes, and cooking ingredients, are relate to cooking. In other words, this indicates that the user has a particular preference for cooking shows in the period from January to May.

From June, in addition to words such as "dishes" and "recipe", words related to the World Cup (the Soccer World Cup) such as "soccer", "Germany" and "the World Cup" that were not recorded from January to May are recorded as preference information.

This indicates that the user's preference for the recorded program changed in June, and a preference relating to soccer was added to the cooking shows. In other words, the user's preferences changed to include the World Cup in June (a part of the change in preference record).

Figure 6:
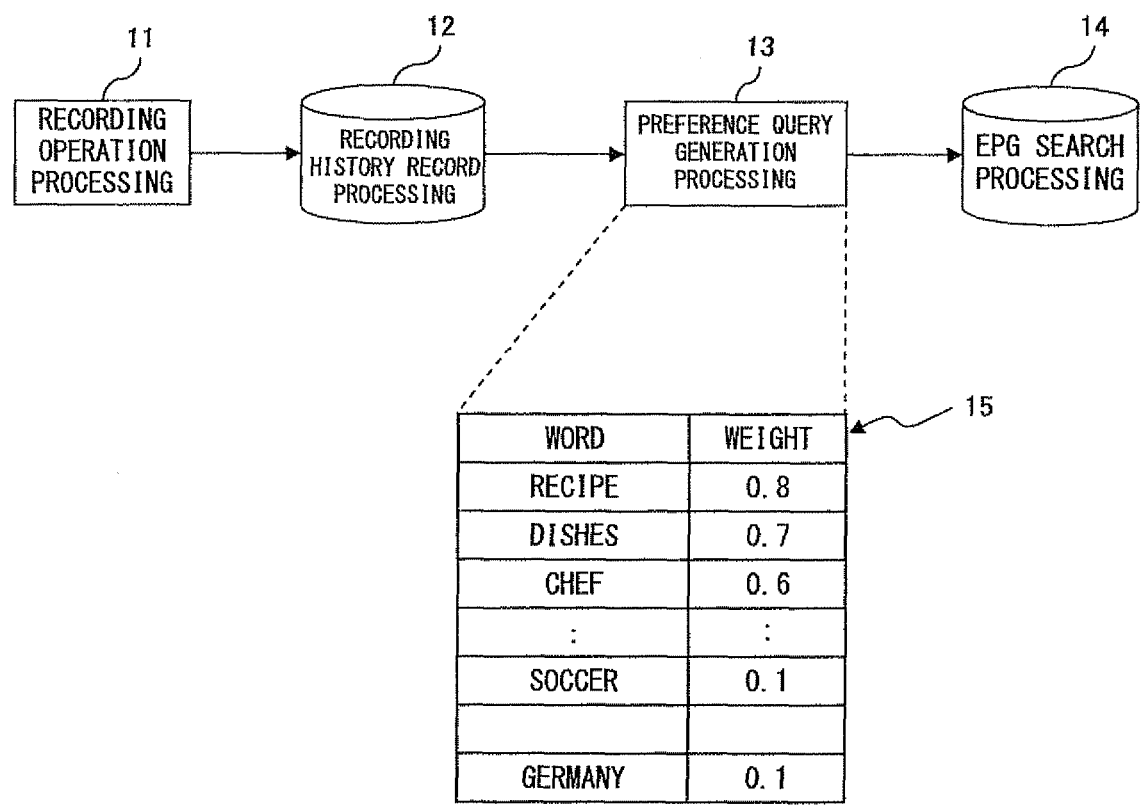
FIG. 6 is a diagram showing a flow of processing in which a preference query for searching for a program using the preference information of FIG. 5.

FIG. 6 is a diagram showing a flow of processing where a preference query is generated when a program is searched using the above preference information.

The top of FIG. 6 shows the processing flow, and the bottom of FIG. 6 shows a word/weight table which was generated in the preference query generation processing.

In the processing flow shown on the top, recording operation processing 11, recording history record processing 12, preference query generation processing 13, and EPG search processing 14 are described.

The recording operation processing 11 controls an operation panel in which the user conducts recording operation and extracts all recording operation events.

The recording history record processing 12 accumulates all operation events of the user relating to the program recording as a recording history in a certain database area of a storage.

The preference query generation processing 13 generates a preference query on the basis of the preference information of FIG. 5 using similar processing methods as shown in FIG. 2 and FIG. 3.

Using the preference query generation processing, a word/weight table 15, as shown in the bottom of FIG. 6, is generated. The word/weight table 15 indicates the weight added to the word which was extracted as a user preference.

By the preference query with the weight indicated in the word/weight table 15, the EPG search processing 14, or processing for searching programs to be recommended to the user, is performed.

Programs to be broadcast containing words similar to the preference queries that have a large weight are recommended to the user.

In the period for June in FIG. 5, the appearance of the words "soccer" and "Germany" in the record of recorded programs is infrequent; therefore, the weight of the words "soccer" and "Germany" is small.

Due to the above, although containing the changed preference information in the most recent period as shown in FIG. 5, the preference query generated on the basis of the period from January to June rarely recommends programs relating to soccer because the weight of the words relating to soccer is small.

In order to solve this problem, a conventional method is for users to clear past preferences once the preference change occurs. However, this is a time-consuming job for users as they must determine their changed preferences and clear the preference information.

In addition, user preferences generally do not significantly change at one time, rather the change occurs gradually from the past preferences to other preferences.

The present invention, as explained below, achieves a program recommendation function that tracks changes in a user's preferences by detecting changes in a user's preferences and generating a preference query in accordance with the amount of change.

Figure 7:
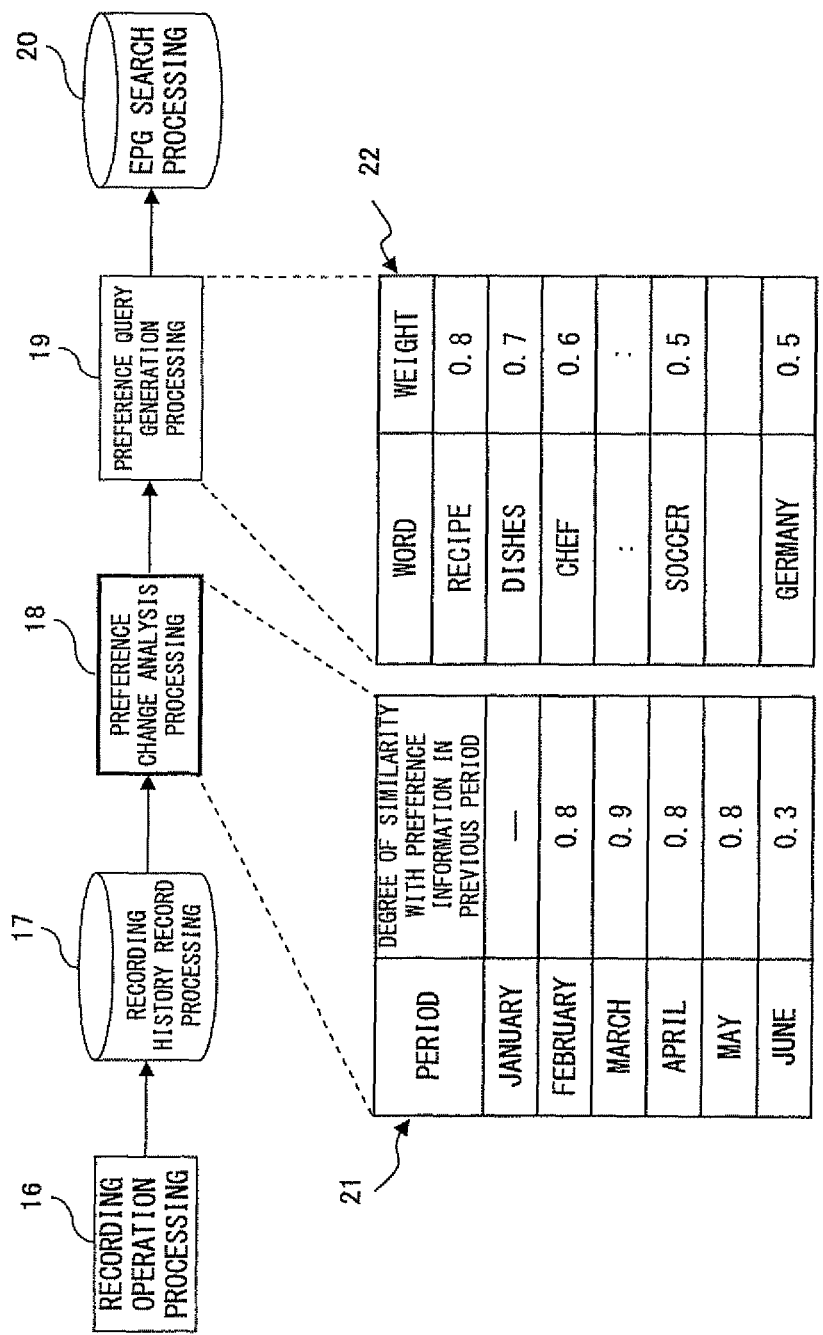
FIG. 7 is a diagram that shows how the present invention utilizes a program recommendation function that follows a user's preferences.

FIG. 7 is a diagram showing a principle of achieving a program recommendation function that tracks a user's preferences according to the present invention.

In the processing of the present invention shown in FIG. 7, the process flow contains recording operation processing 16, recording history record processing 17, preference change analysis processing 18, preference query generation processing 19, and EPG search processing 20.

Note that the recording operation processing 16, the recording history record processing 17, the preference query generation processing 19 and the EPG search processing 20 are nearly the same as the recording history record processing 12, the preference query generation processing 13, and the EPG search processing 20 respectively that are shown in the conventional process flow in FIG. 6.

As shown in the process flow of FIG. 7, in the present invention, the preference change analysis processing 18 is provided between the recording history record processing 12 and the preference query generation processing 13 that are in the conventional process flow shown in FIG. 6 in order to detect changes in a user's preferences.

As a result, the preference query generation processing 19 that follows the preference change analysis processing 18 differs from that of conventional processing.

In this processing, preference information is calculated for each time period (one month in the example), and the degree of similarity between the calculated preference information and the preference information of the previous month is calculated. Consequently, the amount of preference change is calculable.

In the example at the bottom left of FIG. 7 showing a table of similarity with previous period preference information 21, the degrees of similarity indicated in the column entitled "similarity to preference information of previous period" which corresponds to each time period indicated in the column entitled "period", that being "January, February, March, April, May, June", and reading "- - - , 0.8, 0.9, 0.8, 0.8, 0.3", show high degrees of similarity, 0.8 or above, in the period from January to May.

In June, the degree of similarity drops to 0.3, thus revealing the significant change of the user's preferences in June.

In the process flow of FIG. 7, applying the change in the user's preferences from above, in the preference query generation processing 19, the weight of words contained in the most recent (the period of June being the example) recorded program (soccer, Germany in this example) is emphasized (five times in this example), and a preference query is generated.

As a result, in the example of the present invention, the weight of each of the words "soccer" and "Germany" shown in the word/weight table 15 on the bottom of FIG. 6 shows is "0.1", and this weight is emphasized by multiplying each word by five.

In other words, as shown in the word/weight table 22 at the bottom right of FIG. 7, in cases of words such as "recipe, dishes, chef, . . . ", their weights are "0.8, 0.7, 0.6, . . . " respectively, and are the same as the case on the bottom of FIG. 6; however, in the case where new words such as "soccer" and "Germany" appeared due to the preference change, the weight of each word is "0.5", thus emphasizing the weight of words relating to the Soccer World Cup.

As noted above, emphasis is placed on the weight of the programs recorded in June during which the preference changed, and thus the preference query (average vector) is generated from the recorded history of January to June, and recommended programs are searched from the EPG in the EPG search processing 20. As a result, the programs relating to the Soccer World Cup are ranked higher in the recommendation.

FIG. 8 is a flowchart that explains the details of the process of acquiring the preference change via the preference change analysis processing 18.

Note that this process assumes that the process of index generation shown in FIG. 2 has been performed in advance.

In FIG. 8, when the process starts, the most recent period is selected first (step S101). The first recorded program in that most recent period is then selected (step S102).

Next, the weight of each word contained in the recorded program is obtained from the index (step S103). Using the preference information obtained during the selected period as preferences in a certain period, the weight of each word is added to the period preference (step S104).

After determining if the program is the last recorded program, (step S105), and if it is not the last recorded program (N in S105), the next recorded program is selected (step S106), and the process is returned to the process in step S103.

Afterward, the processes of steps S103-S105 (or S106) is repeated. This generates a period preference that adds the weight of each word contained in all recorded programs for the most recent period.

When the last recorded program is determined in step S105 (Y in S105), the generated period preference is normalized (step S107).

After selecting the most recent period, the processes from step S102 in which the first recorded program is selected to step S107 in which the period preference is normalized is basically the same processes as steps S11-S16 of FIG. 3.

In other words, although preference information during a certain period is referred to as period preference in FIG. 8, the period preference generation method is basically the same as the preference query generation method shown in FIG. 3.

The difference in the case of FIG. 8 from that of FIG. 3 is that the recorded programs that are the subject of the period preference processes are limited to a certain time period (the most recent period and one period before the most recent period (previous period)).

Although FIG. 8 shows a processing example that only analyzes the preference change during the most recent period the process content is the same in cases that analyze preference change for each period.

In the example shown in FIG. 8, the period preference in the most recent period and the period preference in the previous period are obtained, and the degree of similarity between the two is calculated.

In FIG. 8, following the process of step S107, it is determined whether the period is the most recent period (step S108), and if the period is the most recent period (Y in step S108), the period before the most recent period (the previous period) is selected (step S106), the process is returned to step S103, the processes of steps S102-S107 as described above are performed, and the period preference of the previous period is normalized.

If it is determined during s108 that the period is not the most recent (N in S108), the degree of similarity between the latest period preference and the previous period preference is calculated (step S110), and the process is terminated.

Consequently, as shown in the bottom left of FIG. 7, the table of similarity with previous period preference information 21 is generated.

It is possible to determine that the preference did not change when the degree of similarity is high, and that the preference has changed when the degree of similarity is low. A method for generating a preference query using such analytical results of preference change is explained below.

Figure 9:
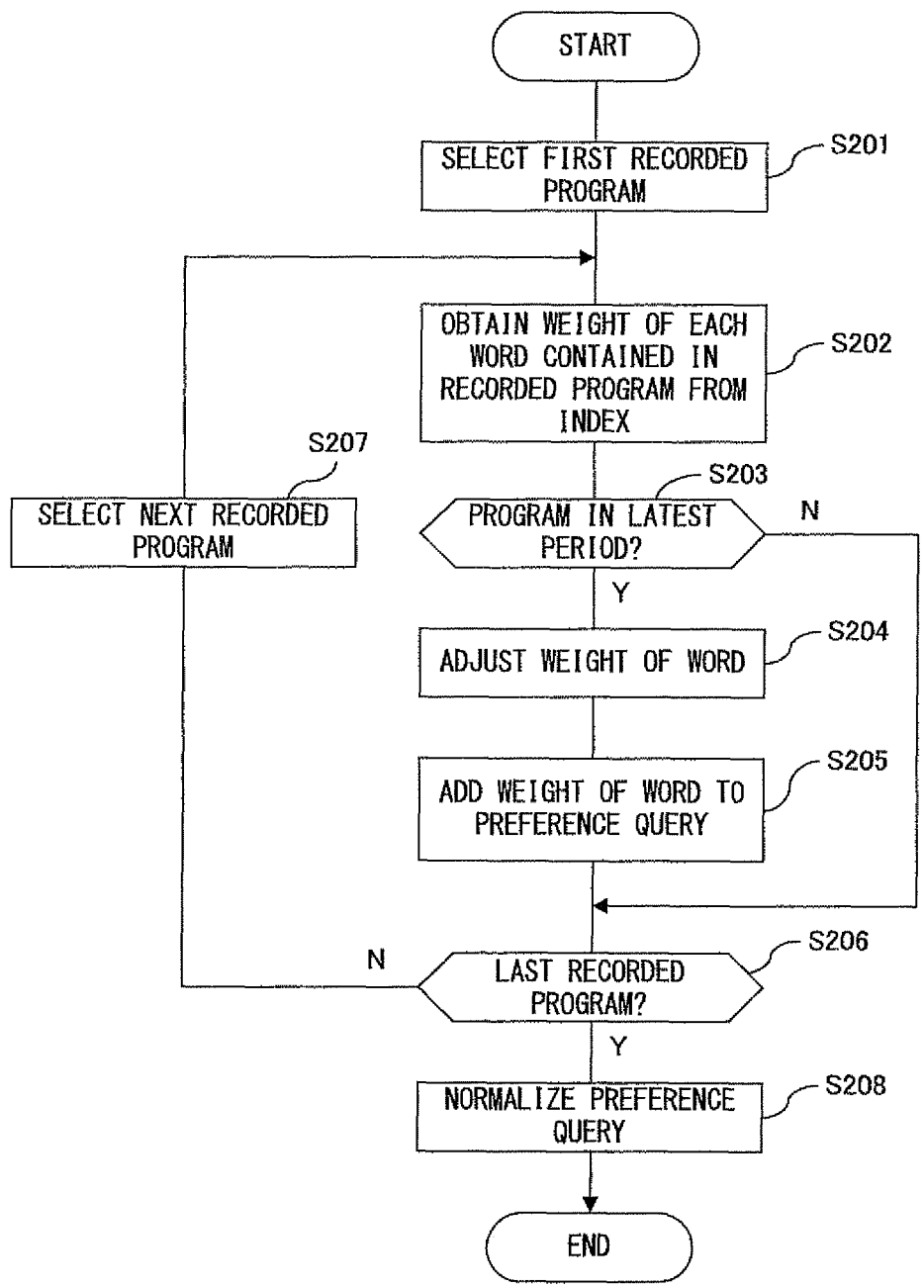
FIG. 9 is a flowchart explaining details of the process of adding weight to a word and emphasizing the word by the preference query generation process.

FIG. 9 is a flowchart explaining the process of generating a preference query in which the weight is emphasized by the preference query generation process 19 of FIG. 7 using the analysis result of the preference change.

Note that the basic method of preference query generation in the present example is almost the same as in FIG. 3. The difference is that when the preference query in the present example generates a program from the most recent period, the processing adjusts the weight of the words in accordance with the analytical results of the preference change.

In other words, the processing in steps S201 and S202 of FIG. 9 is the same as the processing in steps S1 and S12 of FIG. 3. The processing in steps S205-S208 of FIG. 9 is also the same as the processing in steps S13-S16 of FIG. 3.

The flow in FIG. 9 inserts the processing of steps S203-S204 between steps S12-S13 of FIG. 3.

In step S203, it is determined whether or not the program from which a preference query is generated in the processing of the present example is in the most recent period, and if the program is in the most recent period (Y in S203), the weight of the word is adjusted in accordance with the analysis result of the preference change in step S204.

The word/weight table 22 shown at the bottom right of FIG. 7 is generated by the processing of steps S203 and S204.

As explained above, although the adjustment of the weight of the word in the present example during the most recent period is "five times", this multiple is determined in the design stage. However, as described later, because there are other methods for determining the weight, the determination of weight is obviously not limited to this multiple.

In the present example, for words not in the most recent period (N in S203), weight adjustment is not performed because these are considered past words.

The method described above enables the detection of a change in a user's preferences, calculates recommended programs in accordance with the amount of change, and therefore makes possible the realization of a program recommendation function that can respond to user requests more accurately than ever before.

It should be noted that in the preference change analysis method shown in FIG. 8, the amount of change is calculated by using a vector space comprised of the words contained in the EPG and program titles; however, this method, though expecting highly accurate preference change analysis, still has the problem of being time-consuming due to the large amount of calculation required to perform repeated calculations.

The preference change analysis method is not limited to the above method. It is obvious that different methods other than the above method can be employed so long as such methods enable the attainment of preference change in a quantitative manner.

FIG. 10 is a diagram showing an analysis example of preference change using genres as another example of preference change analysis. EPG usually contains genre information for categorizing every type of program.

In the present example, proportions of each genre recorded are obtained from the recording history of each period and the proportions are managed for each period. From the managed data, a table, as shown in the example on the top and bottom of FIG. 10, is generated.

The example shown on the top and bottom of FIG. 10, shows a table containing a column entitled "genre", a column entitled "May" which indicates the previous period, a column entitled "June" which indicates the most recent period, and a column entitled "amount of change" which indicates the difference (absolute value) between the latest period and the previous period for each genre from left to right. The column entitled "genre" includes the genres of "sport, drama, cooking".

As for the proportion in which each of the genres "sport, drama, cooking" was recorded during a period, table 23 at the top of FIG. 10 shows that in the case of the genre "sport", because May, the previous period, has "5", and June, the most recent period, has "2", the amount of change is "3".

For the genre "drama", because May, the previous period, has "3", and June, the most recent period, has "5", the amount of change is accordingly "2". For the genre "cooking", because May, the previous period, has "2", and June, the latest period, has "3", the amount of change is "1".

By summing the above differences in each genre, "3, 2, 1", the amount of preference change "6" can be obtained.

In the example in table 24 shown at the bottom of FIG. 10, the proportions in which each genre of "sport, drama, cooking" were recorded in May in the previous period are "5, 3, 2" respectively, and these are the same as the example in table 23 shown on top of FIG. 10; because the proportions recorded in June for the most recent period are "4, 4, 2" are different from the example in table 23 shown on top of FIG. 10, the amounts of change are therefore "1, 1, 0".

By summing the differences of each genre "1, 1, 0", the amount of preference change "2" can be obtained.

In other words, in the example of the table 23 shown on top of FIG. 10, the amount of change is large, and in the example of the table 24 shown on bottom of FIG. 10, the amount of change is small.

The example shown in FIG. 7 uses the recording history as the detail of TV operations; however, so long as the operation reflects the user's preferences, operations are not limited to recording, and operations for watching, for example, can be used in the same manner.

Note that the intensity of a user's preference changes in value according to the operation details. In general, information of recorded programs is considered to be more user-preferred than that of watched programs.

As described above, in the generation of a preference query, information such as a coefficient of 2 for recording, a coefficient of 1 for watching, and a coefficient of −2 for deleting is set and stored in advance as the weight of a word added to a preference query according to the user's operation details.

By such changes to the coefficients that multiply the weight of words according to the operation details, it is possible to generate a preference query that more accurately reflects the user's preferences.

Figure 11:
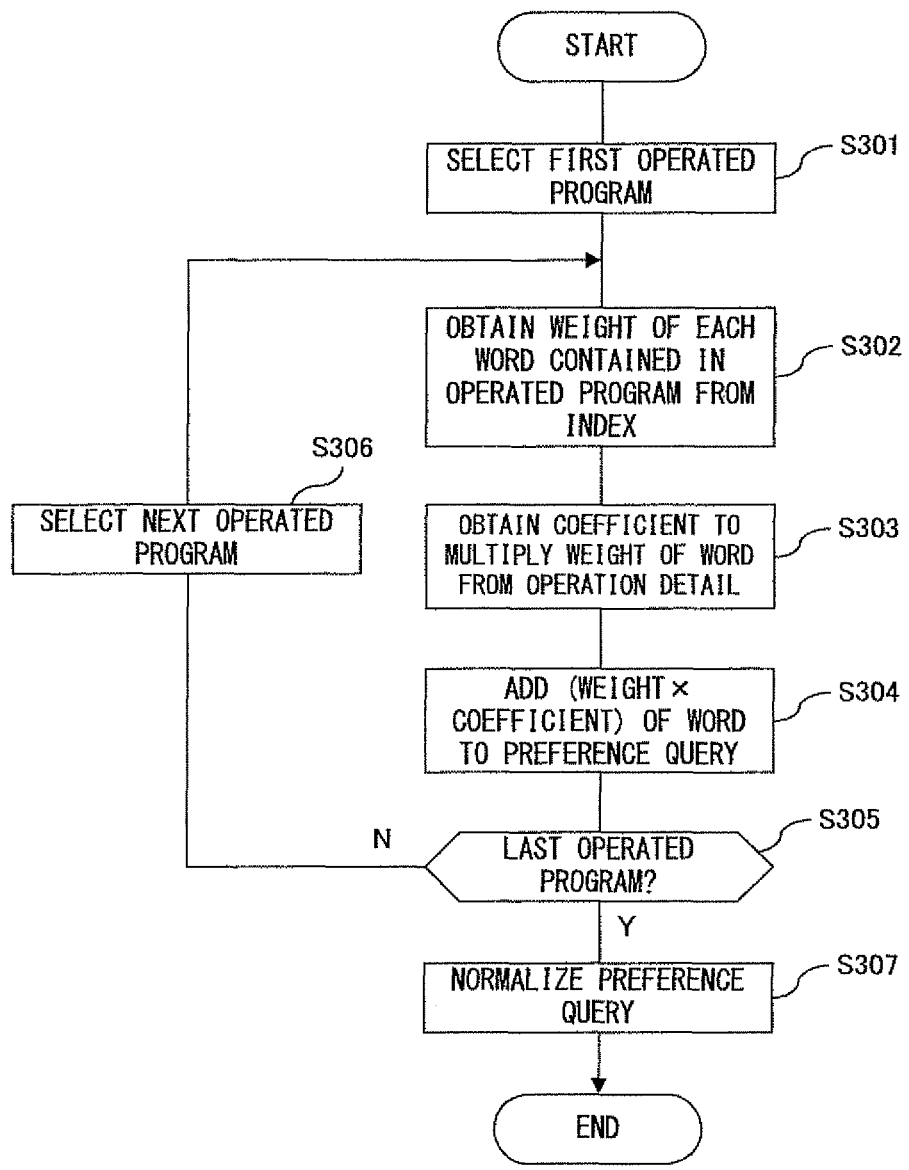
FIG. 11 is a flowchart showing the performance of adjustment processing of weights by changing a coefficient that multiplies the weight of words according to their operation details.

FIG. 11 is a flowchart of the adjustment of process of weights adjusted by changing a coefficient that multiplies the weight of words according to the operation details.

In FIG. 11, when the process is started, the first operated program is selected (step S301), and the weight of each word contained in the operated program is obtained from an index (step S302). This is the same processes as that in steps S11 and S12 of FIG. 3.

Next, a coefficient that multiplies the weight of the word is obtained on the basis of the details of the operation (step S303). In this process, as explained above, the coefficients are set beforehand such that recording=2.0, watching=1.0, deleting=−2.0.

Thereafter, (weight×coefficient) of the word is added to the preference query (step S304). In other words, it is not simply adding the weight as described in the process of step S13 of FIG. 3, but rather the weight is enlarged by multiplication of the coefficient to be added.

Subsequently, whether or not the program is the most recently operated program is determined (step S305), and if the program is not the most recently operated program (N in S305), the processing is returned to step S302.

The processing from steps S302-S305 (or S306) is repeated. As a result, this generates a preference query added with a weight that is emphasized by multiplying each weight of words contained in all recorded programs by a coefficient.

If it is determined in step S305 that the program is the most recently operated program (Y in S305), the generated preference query is normalized (step S307), and the processing is terminated.

The normalized preference query is a preference query that has been adjusted to the user's most recent preference change via a search of programs on the basis of the period preference of the recorded programs in the most recent period.

Note that in the above described calculation of the period preference in FIG. 8, processing in accordance with the operation details is possible on the basis of the same principle as above.

FIG. 12 is a flowchart of processing in which calculation of period preference is performed in accordance with the operation details. The processing of steps S404-S406 in FIG. 12 has a flow such that the processing of step S104 and that of step S105 shown in FIG. 8 are switched.

In order to show the difference between a case in which only the frequency of appearance of recorded programs is obtained and a case in which the weight of words can be changed according to the operation details in the calculation method of the weight added to the word indicating a preference, the indication of "the last recorded program?" in the determination processing of S105 in FIG. 8 is changed into the indication of "the last operated program?" in the determination processing of S406 in FIG. 12.

In FIG. 12, when the processing is started, the most recent period is selected (step S401). The first recorded program in the selected most recent period is then selected (step S402). Next, the weight of each word contained in the recorded programs is obtained from an index (step S403).

Subsequently, in the present example, a coefficient that multiplies the weight of a word is obtained from the contents of the program operation history of a user (step S404). This processing uses an operation coefficient table 25 that is linked to the processing of step S404.

In other words, the operation coefficient table 25, as shown in FIG. 12, has coefficients that correspond to the details of the operations "recording, watching" that are set to "2, 1" respectively. It is of course possible to additionally set the contents of the operation to "deleting" and the corresponding coefficient to "−2", for example.

Following the above processing, the weight of the words is added to the period preference (step S405). In other words, a period preference that has emphasized the weight of the words according to the details of the operation (when a detail of the operation is recording or watching) is sequentially generated.

It is then determined whether or not the program is the last operated program (step S406), and if the program is not the last operated program (N in S405), the next operated program is selected (step S407), and the processing is returned to the processing of step S403.

The processing of steps S403-S406 (or S407) is repeated. As a result, the weight of each word contained in all operated programs in the most recent period is emphasized according to the details of the operation, and a period preference with the weight added to it is generated.

When the determination in step S406 determines that a program is the last operated program (Y in S406), the generated period preference is normalized (step S408).

Subsequently, whether or not the period is the latest period is determined (step S409); if the period is the latest (Y in step S409), then the period before the latest period (previous period) is selected (step S410). Then the process returns to the process of step S402, the above-described processes of steps S402-S408 are performed, and the period preference of the previous period is normalized.

If it is determined that the period is not the latest period in the determination in step S409 (N in S409), the degree of similarity between the most recent period preference and the previous period preference is calculated (step S411), and the process is terminated.

The calculated result in step S411 is not only based on the frequency of appearance of the words as in the calculated result in step S110 of FIG. 8, but the result changes according to the details of the operation by a user.

In the example shown in "table of similarity with previous period preference information 21" at the bottom left of FIG. 7, the weight of words is uniformly increased five-fold when the preference changes significantly.

However, by adjusting the coefficient that multiplies the weight of the word according to the amount of preference change rather than uniformly multiplying the weight of the words, it is possible to follow the changes in a user's preferences more accurately.

Because the amount of preference change can be represented by the degree of similarity in the period preference, the amount of preference change can be managed as a coefficient according to the degree of similarity. In other words, it is possible to change the weight of the words, or consequently the preference query, in accordance with the degree of the change in a user's preferences.

Figure 13:
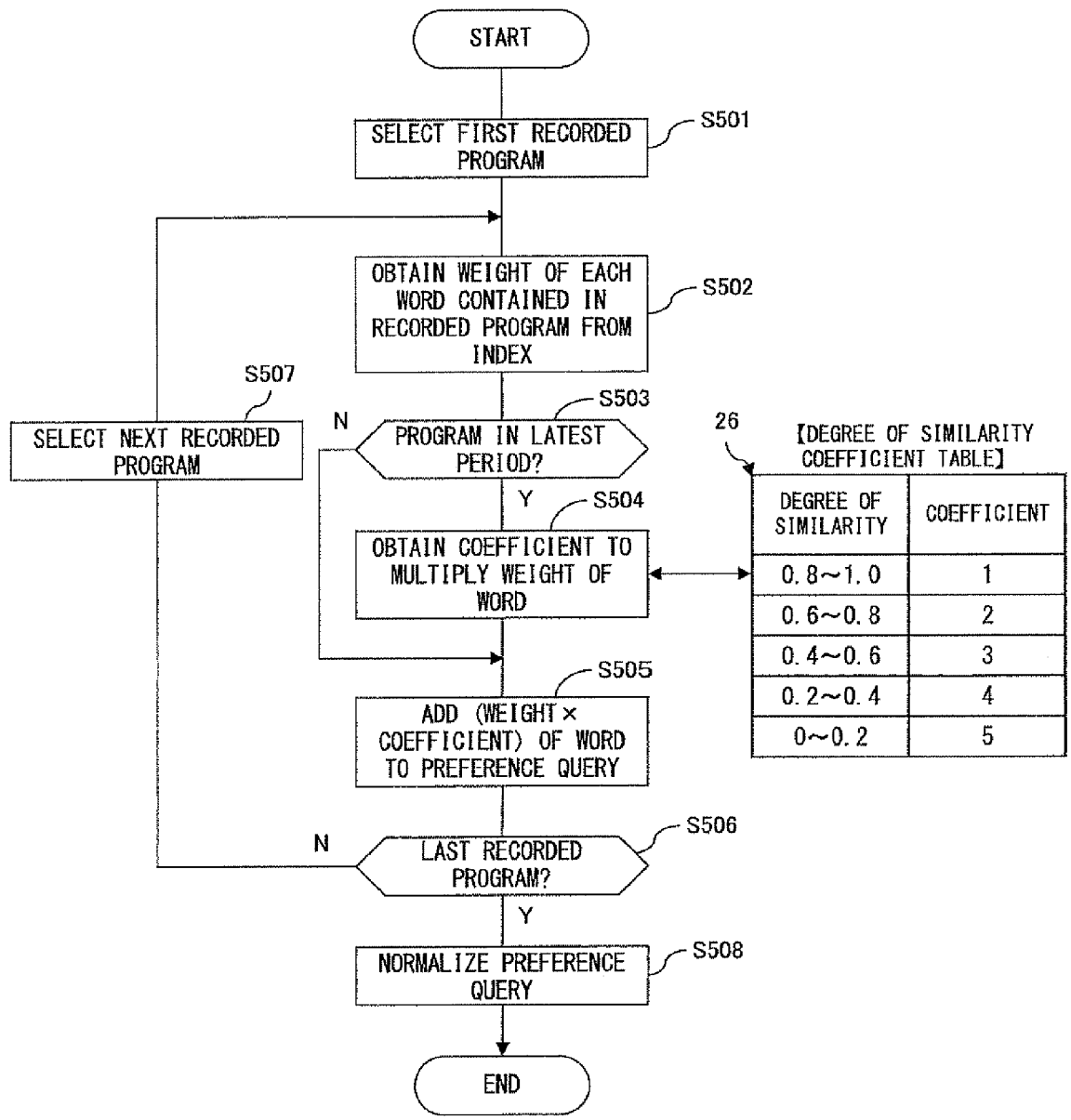
FIG. 13 is a flowchart showing the processing of a method for adjusting the coefficient that is multiplied by the weight of words on the basis of the degree of preference similarity in accordance with the amount of preference change.

FIG. 13 is a flowchart showing the process of a method for adjusting the coefficient that multiplies the weight of words on the basis of the degree of preference similarity in accordance with the amount of preference change.

Note that the processes of steps S504 and S505 in FIG. 13 have a flow such that the process of step S204 and that of step S205 shown in FIG. 9 are switched. In addition, the operation coefficient table 25 is substituted with a degree of similarity coefficient table 26.

In FIG. 13, when the process is started, the first recorded program is selected (step S501). Next, the weight of each word contained in the recorded program is obtained from an index (step S502).

In the present example, following the above process, whether or not the program is in the most recent period is determined (step S503), and if the program is in the most recent period (Y in S503), a coefficient that multiplies the weight of the word is obtained (step S504).

In this process, the degree of similarity coefficient table 26 that is linked to the processing of step S504 in the present example is used on the basis of the degree of similarity obtained in the last processing step S411 of FIG. 12.

In other words, as shown in FIG. 13, the degree of similarity coefficient table 26 has coefficients of "1", "2", "3", "4", and "5" that correspond to the degrees of similarity "0.8-1.01", "0.6-0.8", "0.4-0.6", "0.2-0.4", and "0.0-0.2", respectively.

If the degree of similarity is a large value (small change in preferences), the coefficient is small, and if the degree of similarity is a small value (large change in preferences), the coefficient is large. The weight of the words is multiplied by this coefficient, and the weight of the changed preferences is emphasized.

Following the above process, "weight×coefficient" of the word is added to the preference query (step S505).

Next, whether or not the program is the last recorded program is determined (step S506), and if the program is not the last recorded program (N in S506), the next recorded program is selected (step S507), and the process is returned to the process of step S502.

The processes of steps S502-S506 (or S507) are repeated. As a result, a preference query for a single program in which the weight of the word is adjusted according to the preference change is sequentially generated.

If it is determined in step S506 that the program is the last recorded program (Y in step S506), the generated preference query is normalized (step S508), and the process is terminated.

The normalized preference query is a preference query which has been adjusted to the user's most recent changed preferences.

In the example shown in FIG. 8, the comparison of period preference is performed between the most recent period and the previous period. This method effectively reflects the user's most recent preferences.

However, a preference change that is capable of being determined as either temporary or continuous could be even further responsive to changes in a user's preferences.

FIG. 14 is a diagram showing an example of a period degree of similarity table that determines if a user's preference change is temporary or continuous.

The "table of similarity with previous period preference information 27" shown in FIG. 14 is a table in which the example of preference change analysis shown in the "table of similarity with previous period preference information 21" on the bottom left of FIG. 7 continues into the following month.

In the example of the table of similarity with previous period preference information 27, the preference with a degree of similarity of "0.8 or 0.9" (or not significantly changed) from February to May, which is high, is changed in June (the degree of similarity is decreased to "0.3"), and the degree of similarity, "0.8", was again high in July (no change in preference from the previous month).

That is, it is determined that the preference was similar from January to May, changed in June, and this change has remained continuous into July (the user watched similar programs in June and July).

As above, where the preference change has remained continuous, if the adjustment process of the weight of words only in the latest period in FIG. 9 is extended to the most recent period (in the example of FIG. 14, July being when the change continued) and the previous period (in the example of FIG. 14, June being when the preference changed), it would be possible to perform process that prominently reflects the change in a user's preferences.

Although the flowchart does not indicate it, in the execution of the process of the present example, a moderate weight is added in June during the first change. If the changed preference continues into July, the weight of preference with a high degree of similarity is emphasized. As a result, process that conspicuously reflects the change in a user's preferences can be performed.

Note that in the examples explained above, changes in preferences are calculated, and the weight of the words are adjusted; however, if the analysis process of preference change is omitted, as long as the process that conspicuously reflects the most recent preferences is performed, process that follows a user's preferences in a simplified manner is possible.

This can be realized in the preference query generation process by adding a large weight to the words in the most recent period, and by adding smaller weights as the period becomes older.

As explained above, the present invention detects changes in a user's preferences and automatically generates search requests (preference query) in accordance with the amount of change, and therefore it is possible to realize a highly accurate program recommendation function that follows the changes in a user's preferences.

What is claimed is:

1. A program search apparatus, comprising:
a program information storage unit which stores program information;
an operation history storage unit which stores TV operation history which is a history of an operation of a TV performed by a user;
a preference information management unit which generates preference information, which represents a preference of the user, from the program information and the TV operation history and which manages the preference information at prescribed periods;
a preference change amount calculation unit which calculates an amount of change of the preference of the user using the preference information managed at prescribed periods;
a weight calculation unit which calculates a weight given to the preference information from the amount of change of the preference of the user calculated by the preference change amount calculation unit;
a detection unit which detects an occurrence of a change of the preference of the user using the amount of change of the preference of the user calculated by the preference change amount calculation unit;
a change continuation period calculation unit which calculates a length of a period during which the preference change exists continuously; and
a recommended program search unit which generates a search request by giving the weight to the preference information, the weight being calculated by the weight calculation unit and being emphasized according to the length of the period calculated by the change continuation period calculation unit, and which searches a recommended program from the program information on the basis of the search request when the occurrence of a change of the preference of the user is detected by the detection unit.

2. The program search apparatus according to claim 1, further comprising
a unit which generates vector information as the preference information consisting of the weight of a word calculated from statistics of words and program names and a program name obtained from electronic program information.

3. The program search apparatus according to claim 1, further comprising
a preference information generation unit which generates preference information from a program name and the frequency of appearance of a genre obtained from electronic program information.

4. The program search apparatus according to claim 1, further comprising
an operation detail weight adjustment unit which adjusts the weight of the word contained in the search request in generating the search request according to a TV operation detail included in the TV operation history.

5. The program search apparatus according to claim 1, further comprising
a preference information weight adjustment unit which adjusts the weight of the word contained in the preference information in generating the preference information to be managed at prescribed periods according to the TV operation detail included in the TV operation history.

6. The program search apparatus according to claim 1, further comprising
a degree of similarity weight adjustment unit which adjusts the weight of the word contained in the search request in generating the search request according to the degree of similarity between preferences at prescribed periods.

7. The program search apparatus according to claim 1, wherein
the preference change amount calculation unit sets a target period for calculating the amount of change of the preference of the user to be the most recent period and one period before the most recent period.

8. The program search apparatus according to claim 1, wherein
a target period is set to be the most recent period, and in generating the search request in the target period, the weight of a word consisting of the search request is multiplied by a coefficient of a certain value or higher.

9. A program search method, comprising:
storing program information;
storing TV operation history which is a history of an operation of a TV performed by a user;

generating preference information, which represents a preference of the user, from the program information and the TV operation history and managing the preference information at prescribed periods;

calculating an amount of change of the preference of the user using the preference information managed at prescribed periods;

calculating a weight given to the preference information from the amount of change of the preference of the user;

detecting an occurrence of a change of the preference of the user using the amount of change of the preference of the user;

calculating a length of a period during which the preference change exists continuously;

generating a search request by giving the weight to the preference information when the occurrence of a change of the preference of the user is detected, the weight being calculated from the amount of change of the preference of the user and being emphasized according to the length of the period during which the preference change exists continuously; and searching a recommended program from the program information on the basis of the search request.

10. The program search method according to claim 9, further comprising generating vector information as the preference information consisting of the weight of a word calculated from statistics of words and program names and a program name obtained from electronic program information.

11. The program search method according to claim 9, further comprising generating preference information from a program name and the frequency of appearance of a genre obtained from electronic program information.

12. The program search method according to claim 9, further comprising adjusting the weight of the word contained in the search request in generating the search request according to a TV operation detail included in the TV operation history.

13. The program search method according to claim 9, further comprising adjusting the weight of the word contained in the preference information in generating the preference information to be managed at prescribed periods according to the TV operation detail included in the TV operation history.

14. The program search method according to claim 9, further comprising adjusting the weight of the word contained in the search request in generating the search request according to the degree of similarity between preferences at prescribed periods.

15. The program search method according to claim 9, wherein in calculating the amount of change of the preference of the user, a target period for calculating the amount of change of the preference of the user is set to be the most recent period and one period before the most recent period.

16. The program search method according to claim 9, wherein a target period is set to be the most recent period, and in generating the search request in the target period, the weight of a word consisting of the search request is multiplied by a coefficient of a certain value or higher.

* * * * *